United States Patent
Wilson et al.

(10) Patent No.: US 11,137,515 B2
(45) Date of Patent: Oct. 5, 2021

(54) TIME-DOMAIN BROADBAND DIELECTRIC LOGGING

(71) Applicant: Halliburton Energy Services, Inc., Houston, TX (US)

(72) Inventors: Glenn A. Wilson, Houston, TX (US); Burkay Donderici, Pasadena, CA (US); Luis Emilio San Martin, Albuquerque, NM (US); Wei-Bin Ewe, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 16/464,664

(22) PCT Filed: Dec. 30, 2016

(86) PCT No.: PCT/US2016/069503
§ 371 (c)(1),
(2) Date: May 28, 2019

(87) PCT Pub. No.: WO2018/125214
PCT Pub. Date: Jul. 5, 2018

(65) Prior Publication Data
US 2021/0041592 A1 Feb. 11, 2021

(51) Int. Cl.
*G01V 3/30* (2006.01)
*E21B 47/12* (2012.01)
*G01V 3/38* (2006.01)
*H01Q 1/04* (2006.01)
*H01Q 9/04* (2006.01)
*H01Q 21/06* (2006.01)

(52) U.S. Cl.
CPC ............... *G01V 3/30* (2013.01); *E21B 47/12* (2013.01); *G01V 3/38* (2013.01); *H01Q 1/04* (2013.01); *H01Q 9/0457* (2013.01); *H01Q 21/065* (2013.01)

(58) Field of Classification Search
None
See application file for complete search history.

(56) References Cited

U.S. PATENT DOCUMENTS

| 3,944,910 A | 3/1976 | Rau |
| 4,704,581 A | 11/1987 | Clark |
| 5,132,623 A | 7/1992 | De et al. |

(Continued)

FOREIGN PATENT DOCUMENTS

WO    2007019139 A2    2/2007

OTHER PUBLICATIONS

International Written Opinion, Application Serial No. PCT/US2016/069503, dated Sep. 26, 2017, 12 pgs.

(Continued)

*Primary Examiner* — Douglas X Rodriguez
(74) *Attorney, Agent, or Firm* — Gilliam IP PLLC (57) ABSTRACT

Described are tools, systems, and methods for dielectric logging using transient waveforms. In some embodiments, one or more microstrip antennas are employed for the measurements. In various embodiments, the waveforms are processed in the time-domain to determine the dielectric properties of a formation, from which geophysical formation properties can then be derived. Further embodiments are disclosed.

20 Claims, 10 Drawing Sheets

(56) References Cited

U.S. PATENT DOCUMENTS

| | | | |
|---|---|---|---|
| 5,243,290 A | 9/1993 | Safinya et al. | |
| 5,434,507 A | 7/1995 | Beren et al. | |
| 5,631,562 A | 5/1997 | Cram et al. | |
| 8,316,936 B2* | 11/2012 | Roddy | E21B 41/0085 |
| | | | 166/253.1 |
| 9,063,244 B2* | 6/2015 | Allen | G01V 3/28 |
| 2011/0221443 A1 | 9/2011 | Bittar et al. | |
| 2011/0251794 A1 | 10/2011 | Bittar et al. | |
| 2014/0136113 A1 | 5/2014 | Liu et al. | |

OTHER PUBLICATIONS

International Search Report, Application Serial No. PCT/US2016/069503, dated Sep. 26, 2017, 3 pgs.

Cataldo, et al., "A Noninvasive Resonance-Based Method for Moisture Content Evaluation Through Microstrip Antennas", IEEE Transactions on Instrumentation and Measurement, vol. 58, No. 5, pp. 1420-1426, May 2009.

Hager, et al., "Monitoring of cement hydration by broadband time-domain-reflectometry dielectric spectroscopy", Journal of Applied Physics 96 (2004): 5117-5128.

\* cited by examiner

Frequency
FIG. 6B

TIME-DOMAIN BROADBAND DIELECTRIC LOGGING

BACKGROUND

Dielectric logging tools allow for the evaluation of a formation surrounding a borehole, e.g., during a logging-while-drilling (LWD) or wireline logging operation. Currently available tools generally operate in the frequency domain, using high-frequency electromagnetic signals at one or more discrete frequencies, e.g., within the range from 10 MHz to 1 GHz, to measure dielectric properties of the formation. From the measured dielectric properties, petrophysical and geomechanical (or similar geophysical) formation properties, such as water volume and rock texture properties, can be recovered. These frequency-domain tools are often limited in the amount of information about the formation they can provide and in the depth of investigation they can achieve.

DETAILED DESCRIPTION

Described herein are broadband dielectric logging tools that operate in the time domain, generating and measuring transient electromagnetic waveforms, as well as associated time-domain and time-frequency analysis techniques for processing the waveforms to determine the dielectric properties of a formation and, from the dielectric properties, geophysical formation properties. Dielectric logging tools in accordance with various embodiments include one or more antennas for disposal adjacent to the formation to be characterized (e.g., a microstrip antenna capacitively coupled to the formation), one or more transmission lines connected to the one or more antennas, and an electronics module connected to the transmission line(s) at the other end and including a source for generating and a receiver for receiving the transient waveforms.

In some embodiments, the same transmission line serves to communicate a first transient waveform generated by the source from the electronics module to an antenna and transmit a second waveform, corresponding to the reflection of the first waveform at the antenna due to an impedance mismatch between the transmission line and the antenna, back to the electronics module. The first and second waveforms generally differ in their spectral compositions, and can be analyzed to determine the impedance or some other electrical response parameter of the antenna; this technique is also known as time-domain reflectometry. Since the impedance of the antenna is influenced by the dielectric properties of the adjacent formation, such dielectric properties can be backed out from the measurements. In alternative embodiments, a first waveform is transmitted from the electronics module to a first antenna via one transmission line, and a resulting waveform received at a different second antenna after wave propagation through the formation is sent back to the electronics module via another transmission line. In this case, too, the first and second waveforms can be analyzed to obtain dielectric properties of the formation.

In some embodiments, the first and second transient waveforms are analyzed by time-frequency analysis to obtain an electric response parameter as a function of frequency, spanning a frequency range large enough to capture the resonance characteristics of the antenna and formation. The resonance characteristics (e.g., the resonance frequency) can then be inverted for the dielectric properties of the formation. In other embodiments, the first and second transient waveforms are inverted directly in the time domain for the dielectric properties of the formation. From the dielectric properties of the formation, however obtained, geophysical formation properties can be derived.

Various embodiments will now be described in more detail with reference to the accompanying drawings.

Figure 1:
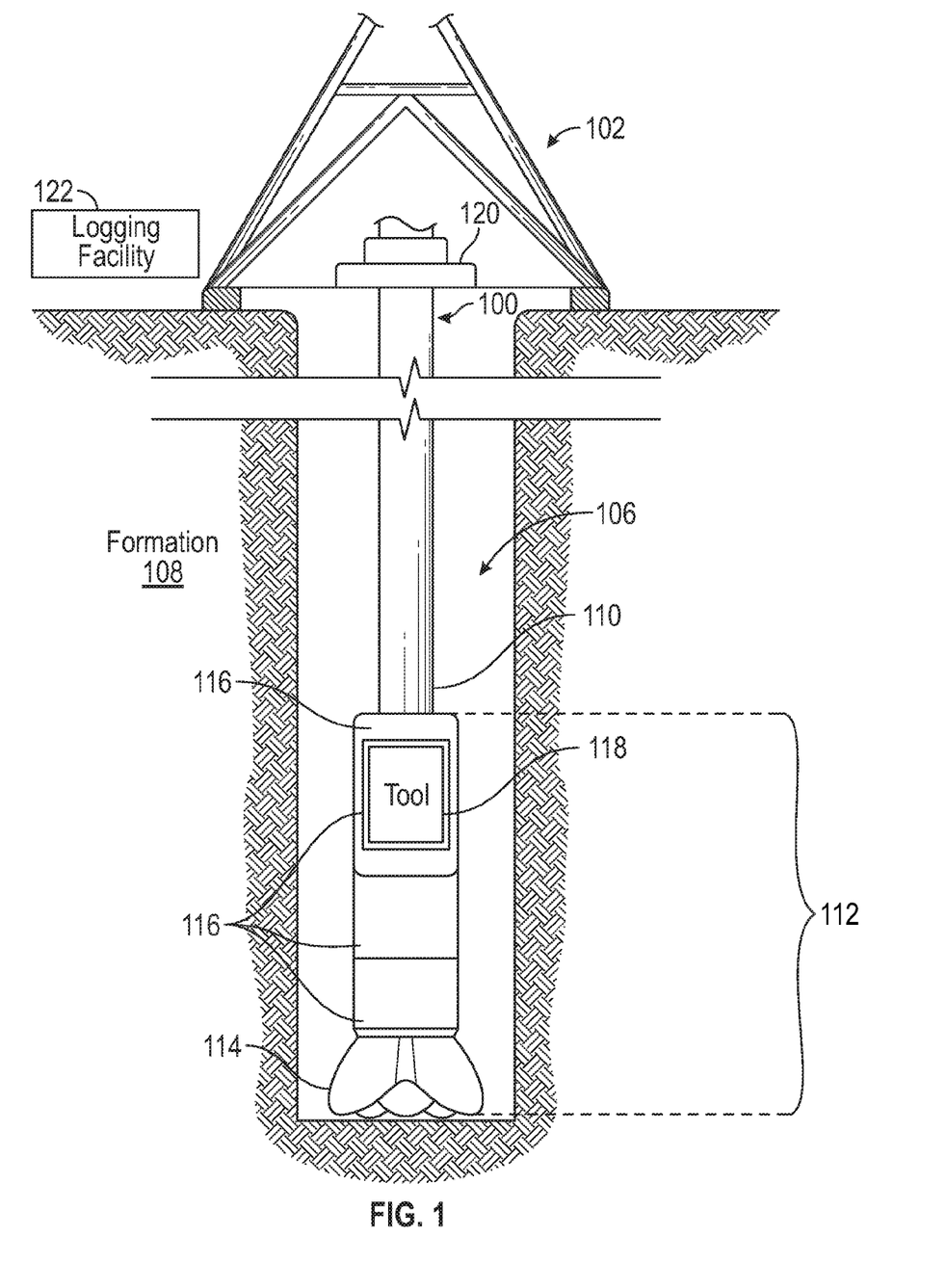
FIG. 1 is a diagram of an example LWD system deployed in a borehole environment, in accordance with various embodiments.

FIG. 1 is a diagram of an example LWD system deployed in a borehole environment, in accordance with various embodiments. During drilling, a drill string 100 suspended from a drilling rig 102 located at the surface of a well is used to drill a borehole 106 through subsurface formations 108. The drill string 100 includes a drill pipe 110 and, generally located at the lower end of the drill pipe 110, a BHA 112. The BHA 112 includes the drill bit 114 for penetrating the surface and subsurface formations 108, one or more drill collars 116 to put weight on the drill bit 114, and usually a number of tools or instruments, such as logging tools 118 for monitoring the properties of the borehole and surrounding formation and fluids during the drilling operation. These tools or instruments 118 may be housed in or otherwise integrated with the drill collars 116, or provided in separate "subs" of the drill string 100. The drill string 100, and the BHA 112 along with it, may be rotated by a rotary table 120. Alternatively or additionally, the BHA 112 may be rotated by a top drive or a (e.g., mud) motor located downhole.

The one or more logging tools 118 in the BHA 112 may be used to acquire data in real time (or near real time) at increasing borehole depths as the drill bit 114 advances—a technique known in the industry as "logging while drilling" (LWD) or "measuring while drilling" (MWD). By tracking the depth of the tool 118 and correlating it with the measurements, a log, that is, a measured quantity as a function of depth within the borehole 106, is generated. Furthermore, tracking the rotational position of the BHA 112 facilitates azimuthal measurements with tools 118 that are directional (e.g., receive signals only from a certain azimuthal window that rotates along with the tool 118), as is explained in more detail below. The data acquired by the tool may be conveyed uphole, often in real time or near-real time, by wired communication or wirelessly, e.g., using mud-pulse telemetry or electromagnetic telemetry. At the surface, a logging facility 122, implemented, e.g., with a general-purpose computer (including one or more processors and memory) running suitable software or with some other processing circuitry, may receive, store, and process the measurements. Alternatively, the data may be processed (in whole or in part) downhole by processing circuitry integrated into the logging tool 118 (e.g., an embedded microcontroller executing suitable software), or stored in downhole memory contained within the tool 118 and processed once the tool 118 has been brought back up to the surface.

Figure 2:
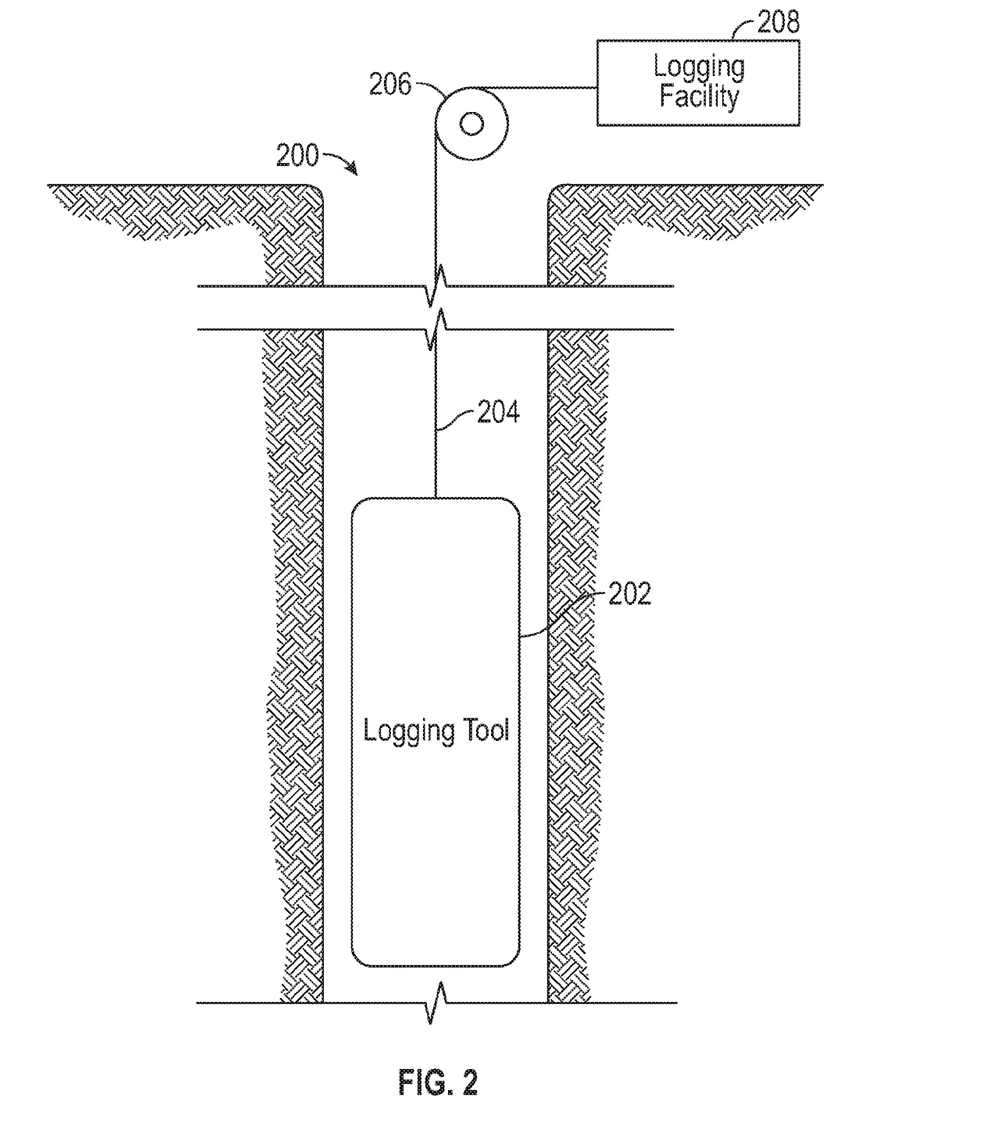
FIG. 2 is a diagram of an example wireline logging system deployed in a borehole environment, in accordance with various embodiments.

FIG. 2 is a diagram of an example wireline logging system deployed in a borehole environment, in accordance with various embodiments. Wireline logging is carried out after drilling has been completed and the drill string has been pulled out of the borehole 200, and involves lowering the logging tool 202 into the borehole 200 on a wireline 204, which may be wound around a winch 206 mounted on a logging truck. The wireline 204 is an electrical cable that, in addition to delivering the tool 202 downhole, serves to provide power to the tool 202 and transmit control signals and/or data between the tool 202 and a logging facility 208 located above surface (e.g., inside the logging truck). The logging facility 208 may be implemented, e.g., with a general-purpose computer (including one or more processors and memory) running suitable software, or with some other processing circuitry. In some embodiments, the logging tool 202 is lowered to the bottom of the region of interest and subsequently pulled upward, e.g., at substantially constant speed. During this upward trip, the tool 202 may perform measurements, either at discrete positions at which the tool 202 halts, or continuously as it passes by the borehole wall. The measurements may be communicated to the logging facility 208 via the wireline 204 or by alternative means (such as mud-pulse telemetry or another type of telemetry), and may be processed at the logging facility 208 to determine a formation or borehole property of interest (e.g., in accordance with various embodiments, a dielectric property, from which rock properties can, in turn, be extracted). From a sequence of measurements correlated with the depths along the borehole 200 at which they are taken, a log of the formation or borehole property can be generated. In some embodiments, the logging tool 202 includes processing circuitry (e.g., an embedded microcontroller executing suitable software} for processing the measurements in whole or in part downhole, and/or memory for storing the data until they can be downloaded from the tool 202 once the tool has been retrieved from the borehole 200.

Alternatively to being conveyed downhole on a wireline, as described above, the logging tool can be deployed using other types of conveyance, as will be readily appreciated by those of ordinary skill in the art. For example, the tool may be lowered into the borehole by slickline (a solid mechanical wire that generally does not enable power and signal transmission), and may include a battery or other independent power supply as well as memory to store the measurements until the tool has been brought back up to the surface and the data retrieved. Alternative means of conveyance include, for example, coiled tubing or downhole tractor.

Figure 3A:
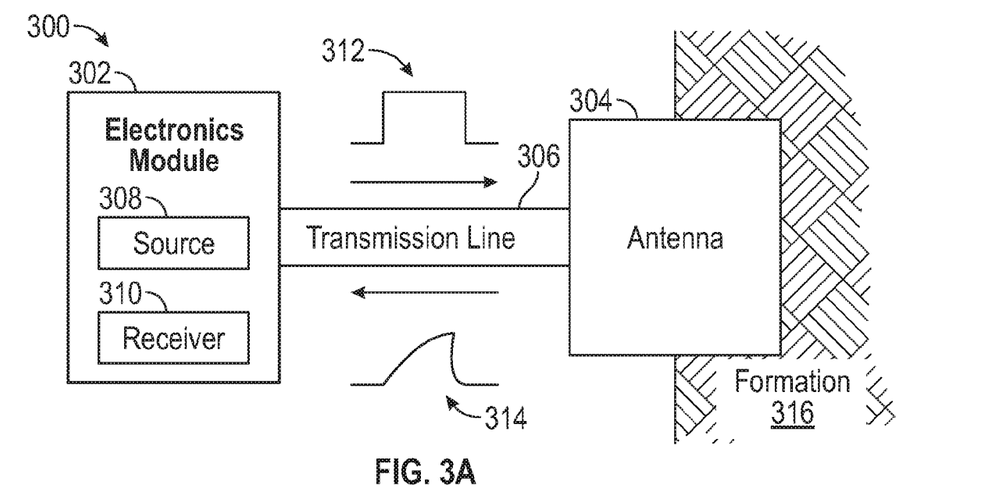
FIG. 3A is a conceptual diagram of a dielectric logging tool using time-domain reflectometry to characterize a borehole formation, in accordance with various embodiments.
Figure 3B:
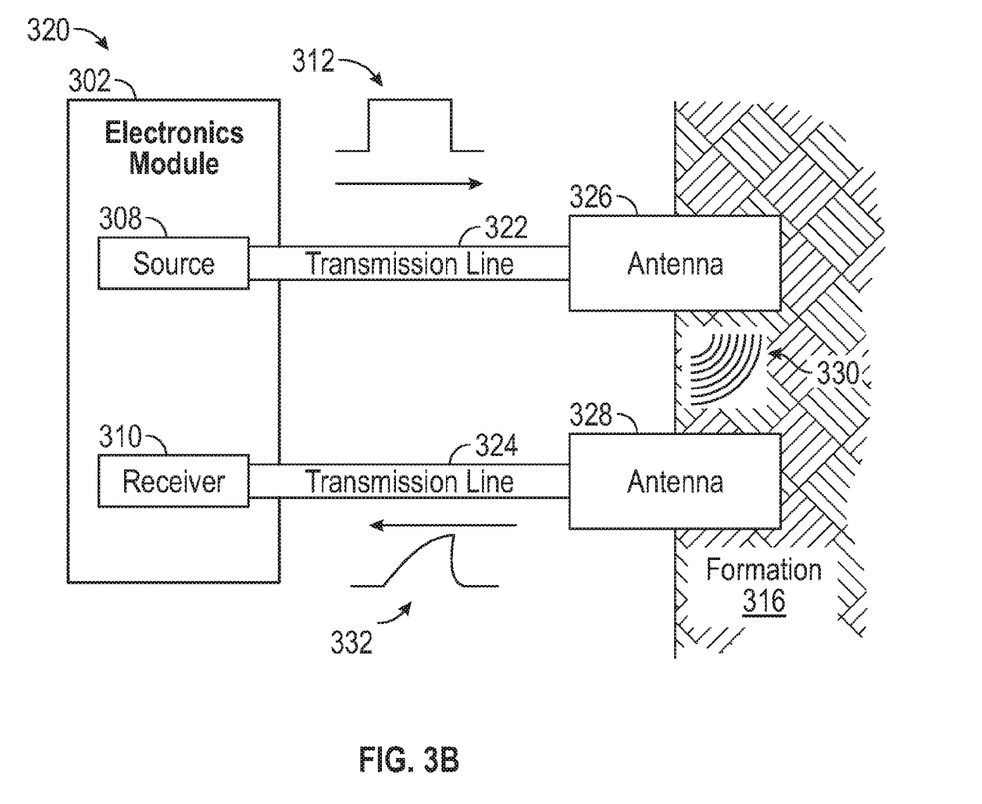
FIG. 3B is a conceptual diagram of a dielectric logging tool using electromagnetic wave transmission between two antennas to characterize a borehole formation, in accordance with various embodiments.

In accordance with various embodiments, the logging tool (e.g., tool 118 of FIG. 1 or tool 202 of FIG. 2) is a dielectric logging tool that uses one or more antennas placed adjacent to the borehole wall to measure transient electromagnetic waveforms, from which formation properties can then be determined. FIGS. 3A and 3B illustrate the operating principle of two alternative tool configurations.

FIG. 3A conceptually depicts a dielectric logging tool 300 using time-domain reflectometry to characterize a borehole formation, in accordance with various embodiments. The tool 300 includes an electronics module 302 and an antenna 304 connected to each other via a transmission line 306 (such as, e.g., a 50Ω coaxial cable). The electronics module 302 includes a source 308 configured to generate transient voltage waveforms to be fed into the transmission line 306 at one end of the transmission line 306, and a receiver 310 configured to measure the generated waveforms as well as any waveforms coming back through the transmission line 306 from the other end. The source 308 may be implemented, for instance, using a conventional voltage waveform generator capable of creating electronic signals in accordance with any of a number of well-defined waveforms, such as a sine wave or a square wave, and may be operated to create, for each measurement, one pulse of such a waveform. For example, as shown in FIG. 3A, the source 308 may transmit a transient waveform 312 corresponding single square pulse, that is, a transient waveform characterized by steep rising and falling edges and a substantially constant signal level therebetween. The receiver 310 may be implemented, for instance, using a combination of electrical components such as amplifiers, analog and digital converters.

The generated transient waveform 312 (herein also the "first transient waveform") is transmitted to the antenna 304, where any impedance mismatch between the transmission line 306 and the antenna 304 causes a reflection. The reflected waveform 314 (herein also the "second transient waveform") travels back through the transmission line 306 to the electronics module, where the receiver 310 can measure it. In general, the transmitted and reflected waveforms 312, 314 differ in spectral composition (and, thus, shape), allowing the impedance of the antenna 304, or a scattering parameter (also "S-parameter") or other electrical parameter, to be computed from the analysis of the transmitted and reflected waveforms 312, 314 (using suitable processing circuitry, which may be implemented in the tool 300 or in a separate processing facility communicatively coupled to the tool 300). The impedance and S-parameter(s) of the antenna 304 depend on the dimensions and material properties of the antenna 304, and are further affected by the dielectric properties of the immediate surroundings of the antenna 304. Accordingly, by electrically (e.g., capacitively, galvanically, or inductively) coupling the antenna 304 to the formation 316 around a borehole and processing the transmitted and reflected waveforms 312, 314, information about the dielectric properties of the formation can be obtained.

FIG. 3B conceptually depicts a dielectric logging tool 320 using electromagnetic wave transmission between two antennas to characterize a borehole formation, in accordance with various embodiments. In this tool 320, the electronics module 302 is coupled via two transmission lines 322, 324 to two separate antennas 326, 328 electrically coupled (e.g., capacitively, galvanically, or inductively) to the formation 316. A first transient waveform 312 received from the source, via the transmission line 322, at the first antenna 326 launches an electromagnetic wave 330 into the formation 316. Upon receipt of the electromagnetic wave 330 travelling through the formation 316 at the second antenna 328, a second transient waveform 332 is transmitted by the transmission line 324 from the second antenna 328 to the electronics module 302. From an analysis of the measurements of the first and second transient waveforms 312, 332 by the receiver 310, dielectric properties of the penetrated formation can be obtained.

Figure 4:
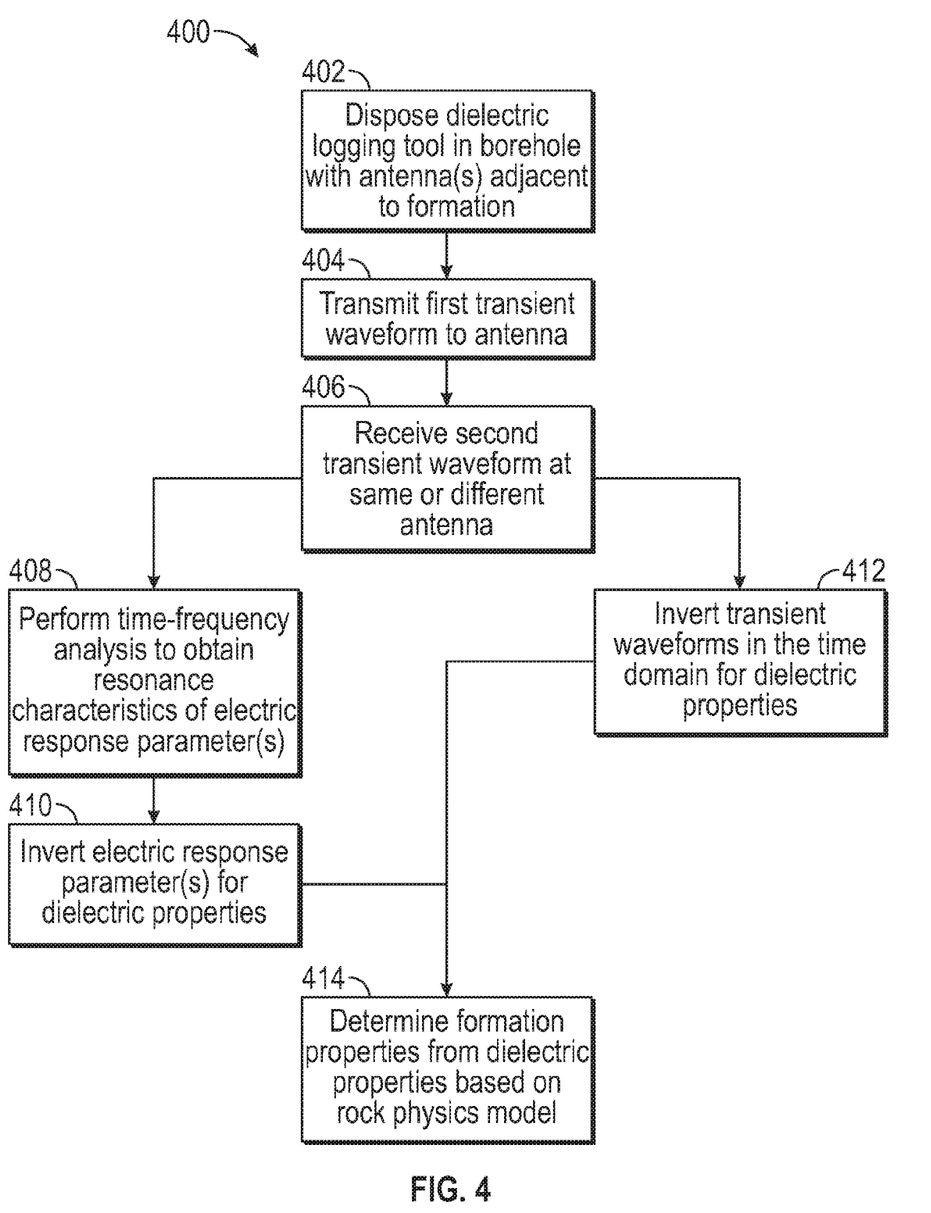
FIG. 4 is a flowchart of dielectric logging methods in accordance with various embodiments.

FIG. 4 is a flow chart of dielectric logging methods 400 in accordance with various embodiments. The methods 400 involve disposing an electromagnetic logging tool (e.g., the tool 300 or 320) in a borehole such that one or more antennas of the tool are adjacent and electrically coupled to the formation surrounding the borehole (act 402). A signal source within the tool (e.g., source 308) is then used to transmit a first transient waveform via transmission line to one antenna (e.g., antenna 304 or 326) of the tool (act 404), and a receiver (e.g., receiver 310) measures the first transient waveform as well as a second transient waveform received, in response to the first transient waveform, either from the same antenna via the same transmission line (in which case the second transient waveform is a reflection of the first transient waveform at the antenna) or from another antenna of the tool via another transmission line (following electromagnetic wave propagation through the formation from one antenna to the other) (act 406). Passive resistive, inductive, and/or capacitive components may be deliberately introduced to the transmission line for the purpose of real-time calibration.

In some embodiments, the first and second transient waveforms are processed by time-frequency analysis (e.g., using Fourier transforms, Laplace transforms, Wavelet transforms, etc.) to extract one or more electric response parameters such as, e.g., the impedance or S-parameter of the antenna(s) as affected by the adjacent formation (act 408). The electric response parameters are sampled across a frequency range sufficiently to broad to capture the resonance characteristics of the antenna and formation; in one embodiment, the electric response parameters span a frequency range from about 1 MHz to about 1 GHz. The resonance frequency will depend on the dielectric properties of the formation and vary with changes in those dielectric properties. From the impedance{s) and/or S-parameter(s), or other electric response parameter(s), the real and imaginary parts of the dielectric properties of the formation can be determined (act 410). For example, a one-, two-, or three-dimensional model of the formation may be used conjunction with transmission line analysis to compute the electric response pararneter(s) at a number, or across a range, of frequencies. The dielectric properties may constitute adjustable parameters of the model, whose values may be optimized by multi-frequency inversion. The inversion may be performed either deterministically, or stochastically with or without regularization. A-priori information can be imposed on the formation models by means of a choice of data weights, model weights, regularization, and/or model constraints, and/or by incorporating a-prior models. In some embodiments, a resonant frequency associated with the electric response parameter exhibits a unique functional dependence on a dielectric property of interest (see, e.g., FIG. 6C), allowing that functional dependence to be pre-computed based on the model and thereafter used to determine the dielectric property of interest from the observed resonant frequency by a simple look-up. In some embodiments, the first and second transient waveforms are inverted for the dielectric parameters directly in the time-domain (act 412); various time-domain processing techniques are described in more detail below with respect to FIG. 5.

The real part of the dielectric properties is generally related to the formation permittivity and/or other relaxation parameters (e.g., induced polarization), and the imaginary part of the dielectric properties is generally related to the formation resistivity and/or other relaxation parameters (e.g., relaxation losses). From the real and imaginary parts of the dielectric properties, geophysical (e.g., petrophysical and geomechanical) formation properties such as water saturation (or water volume) and rock texture parameters (e.g., grain size, grain orientation, fraction volume pyrite, fraction volume clay) are extracted via rock physics models, e.g., using algebraic transforms or inversion methods (act 414). Rock physics models that relate geophysical formation properties to dielectric properties may be based on empirical relationships (e.g., Archie's law) or on deterministic analytical/theoretical modelling (e.g., effective medium theory).

In general, the measurement and analysis of the first and second transient waveforms (acts 404, 406 and 408, 140 or 412) is performed for a plurality of depths along the borehole, e.g., at regular depth intervals as the logging tool traverses the borehole. From the dielectric properties at the different depths, a log of the dielectric properties can be created. In some embodiments, measurements are, moreover, taken at different azimuthal angles and combined to create a two-dimensional (depth-azimuth) image of the dielectric properties.

Figure 5:
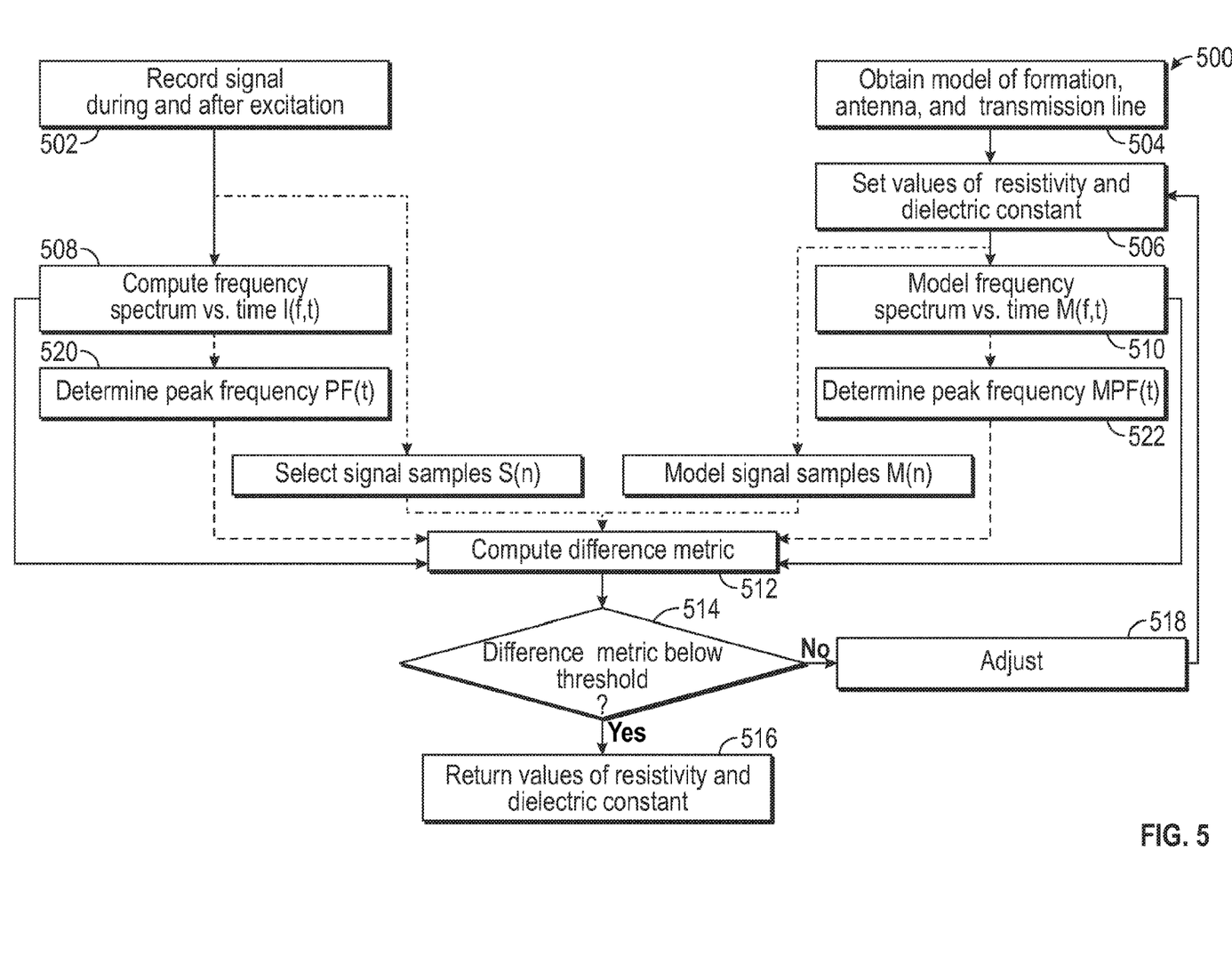
FIG. 5 is a flowchart of time-domain methods for determining dielectric properties from measured transient waveforms, in accordance with various embodiments.

FIG. 5 is a flowchart of time-domain methods 500 for determining dielectric properties from measured transient waveforms, in accordance with various embodiments. In this case, the signal in the time domain is recorded during and after the excitation of the microstrip antenna (act 502), at a sample rate sufficiently above the Nyquist rate to capture the high frequencies used in dielectric logging. The sampling duration may range from 1 nano-second to 10 seconds. The sample rate may be in the range from 1 KHz to 100 GHz; for example, it may be 10 GHz. The sampled signals, processed in one of various ways, can then be inverted for the dielectric properties of the formation based on a computational model describing the transmission line, antenna, and formation, obtained in act 504. The model includes adjustable dielectric parameters (e.g., resistivity and dielectric constant), which are initiated in act 506. In some embodiments, short-time frequency transform (STFT) is applied to the recorded signal to compute a two-dimensional image containing the frequency spectrums as a function of time, denoted as I(f,t) (act 508). A corresponding modeled image containing the frequency spectrum as a function of time, denoted as M(f,t), is computed from the model of the formation, antenna, and transmission line with the set values of the dielectric parameters (act 510). The discrepancy between model and measurement is then evaluated by computing, in act 512, a difference metric between the images M(f,t) and I(f,t). If the difference metric is below a specified threshold (as determined at 514), the current values of the dielectric properties are returned as the optimized values (act 516). Otherwise, the values of the dielectric properties are adjusted (act 518) iteratively until the difference metric falls below the threshold. Alternative embodiments, rather than minimizing the difference metric for the frequency spectrum vs. time itself, involve calculating the peak frequency as a function of time PF(t) from the image I(f,t) (act 520), and a corresponding modeled peak frequency MPF(t) from the modeled image (act 522), and minimizing the difference between those peak frequencies (summed or integrated over time). In yet another embodiment, a number of representative time-domain data samples S[n] are selected from the received signals (act 524), and corresponding modeled samples M[n] are computed (act 526), and optimized values of the dielectric properties of the formation are obtained by minimizing the difference between the selected measured and modeled samples S[n] and M[n] (acts 512-518). In all of these methods, signal portions associated with later times can be used to obtain information for greater depths of investigation, and signal portions associated with earlier times can be used to obtain information for smaller depths of investigation. In some embodiments, a radial profile of the dielectric properties is constructed through one-dimensional radial inversion based on a cylindrical model of the formation as concentrically, cylindrically layered media with a different resistivity and dielectric constant in each layer. In other embodiments, more realistic three-dimensional models are used.

In various embodiments, the antenna(s) that receive transient waveforms from the source and, in time-domain reflectometry embodiments, reflect them back along the transmission line, are capacitive antennas. For example, in some embodiments, one or more microstrip or patch antennas are used. A microstrip antenna may be formed as an electrically conductive (e.g., metallic) patch disposed on an electrically insulating substrate, with a continuous conductive layer disposed on the opposite side of the substrate to form a ground plane. Common microstrip shapes include square, rectangle, circle, and ellipse, but, alternatively, the microstrip antenna may take the shape of a triangle, bow-tie, spiral, disk, circular ring, ring sector, or any other kind of two-dimensional geometric shape. The substrate may be a chemically inert, non-conductive, dielectric substrate such as a ceramic, polymer, or resin. In some embodiments, a thin superstrate, likewise of a chemically inert, non-conductive, dielectric material that is, moreover, mechanically resistant (such as a ceramic, polymer, or resin), is disposed above the microstrip antenna to physically separate the microstrip antenna from the formation, such that the microstrip antenna couples capacitively to the formation. In other embodiments, the superstrate is absent such that the microstrip antenna can be placed in physical contact with the formation and, thus, galvanically coupled to the formation. Microstrip antennas can be manufactured inexpensively by lithographic printing techniques.

The characteristic impedance (or other electric response parameters) of the capacitive antenna(s) is dependent upon the type of antenna (e.g., material and dimensions), the substrate and superstrate materials, and the formation. Changes in the characteristic impedance of capacitive antenna(s) measured as the dielectric logging tool traverses the borehole can be directly attributed to changes in the properties of the formation passing by. In the frequency range from about 1 MHz to about 10 GHz, the impedance of the formation will manifest as a resonance in the characteristic impedance of the capacitive antenna. In some embodiments, the capacitive antenna is designed, via suitable dimensions and material selections, to resonate at a specified desired frequency, e.g., 1 GHz; the specified resonance frequency may be chosen based on expected values (or value ranges) of the dielectric properties to maximize sensitivity to change in the dielectric properties. In embodiments with two or more capacitive antennas, the different antennas may be designed to have different respective properties (e.g., dimensions) such that each capacitive antenna has a unique resonant frequency. The antenna properties may be chosen such that, collectively, the antennas have sensitivity across a range of dielectric properties that spans the range of dielectric properties usually encountered in well logging.

Figure 6A:
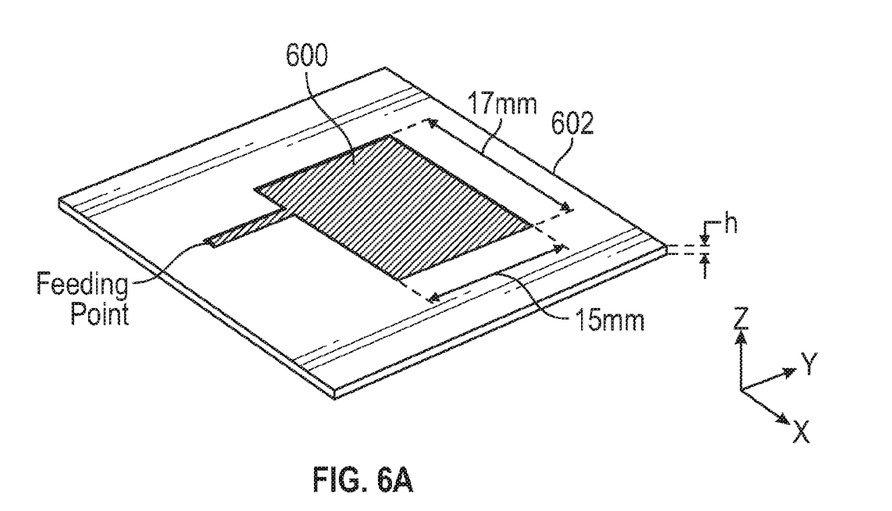
FIG. 6A is a schematic perspective of an example microstrip antenna in accordance with one embodiment.
Figure 6B:
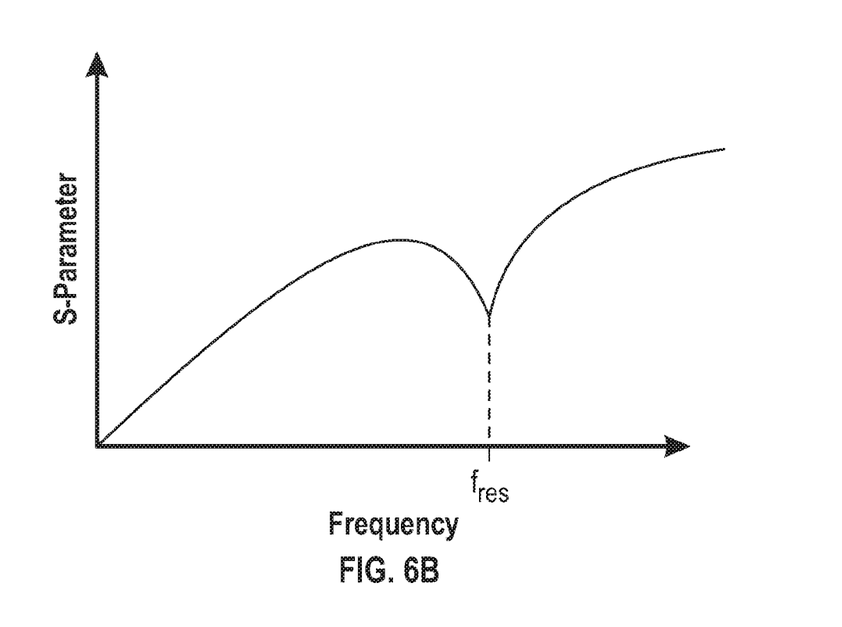
FIG. 6B is a conceptual graph of the S-parameter of the antenna of FIG. 6A adjacent a formation, plotted as a function of frequency and illustrating a distinct resonance.
Figure 6C:
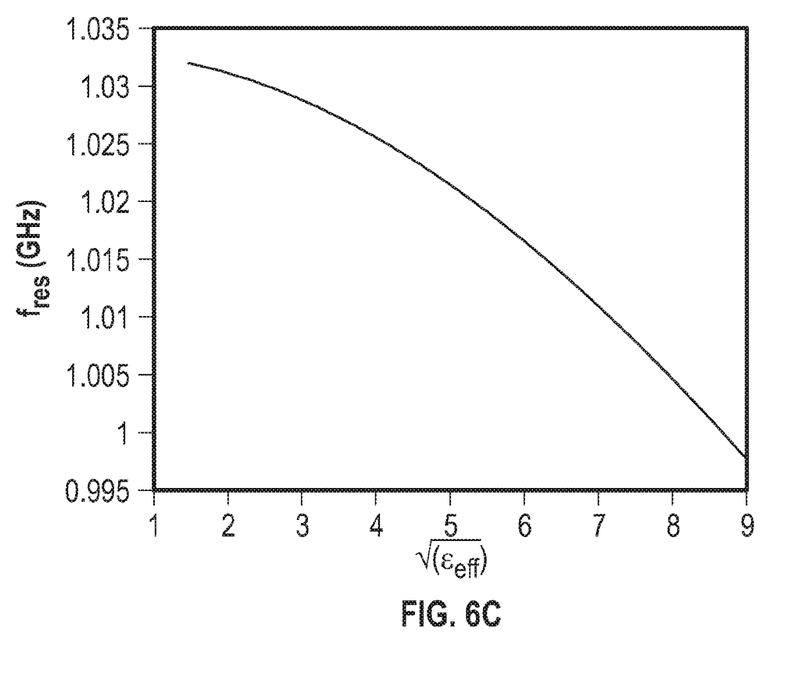
FIG. 6C is graph of resonant frequency of the antenna of FIG. 6A as a function of the root relative permittivity of the formation, in accordance with one embodiment.
Figure 6D:
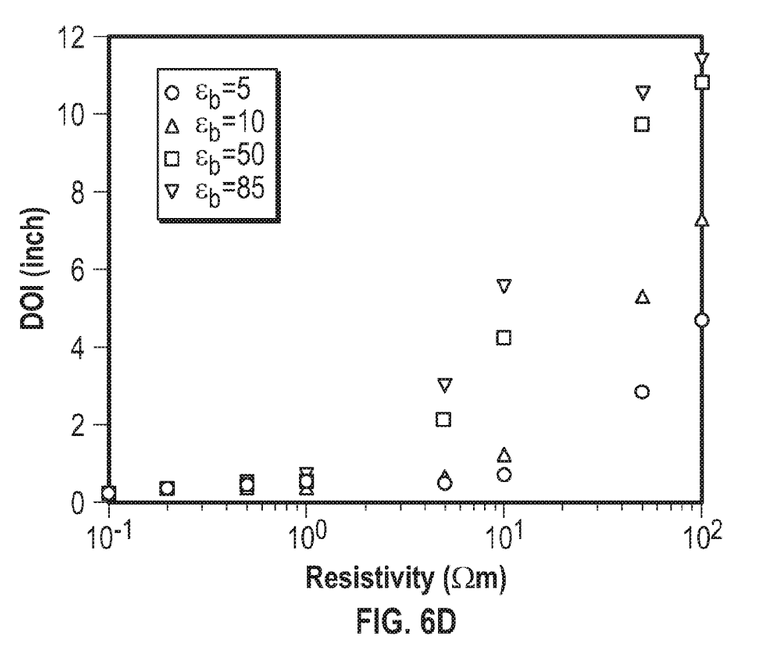
FIG. 6D is graph of the depth of investigation (DOI) achieved with the microstrip antenna depicted in FIG. 6A, in accordance with one embodiment, for different formations having different values of resistivity and permittivity.

FIG. 6A is a schematic perspective of an example microstrip antenna 600 in accordance with one embodiment. The antenna 600 is rectangular and has a width and length of 17 mm and 15 mm, respectively. It is assumed to be disposed on a dielectric substrate 602 with a relative permittivity of 100, and it resonates in free space at 1 GHz. The structure does not include a superstrate; rather, the antenna 600 is placed in direct contact with the formation. FIG. 6B is a conceptual graph of the S-parameter as a function of frequency, as it may be obtained from measurements with the antenna 600 of FIG. 6A for given dielectric properties of the adjacent formation. The S-parameter exhibits a distinct resonance (at frequency fres). FIG. 6C is a graph of the resonant frequency $f_{res}$ of the antenna 600 in the presence of a uniform formation having a resistivity of 100 Om with variable relative permittivity Eeff, calculated using a transmission line model. The resonant frequency is plotted as a function of the square root of the relative permittivity relative permittivity relative permittivity $\varepsilon_{eff}$. It is observed that the resonant frequency of the antenna is a unique, monotonic function of the root relative permittivity of the formation, relative permittivity $\sqrt{\varepsilon_{eff}}$, facilitating the straightforward inversion of the measured resonant frequency for the relative permittivity of the formation. FIG. 6D is graph of depth of investigation (DOI) of the microstrip antenna 600 for different formations having different values of resistivity and permittivity. The DOI is determined from an integrated radial sensitivity obtained by summing over the responses due to small perturbations, which can be calculated using the Born approximation. As FIG. 6D shows, for different resistivity and permittivity combinations, DOIs from 1" to beyond 4" (the usual DOI of conventional dielectric logging tools) are possible to achieve.

In some embodiments, to obtain more diverse information about the formation, one or more additional antennas are used in conjunction with one or more microstrip (or other capacitive) antennas to receive signals transmitted into the formation by the microstrip antenna(s). These additional antenna(s) may be or include microstrip antennas and/or other types of antennas, such as, without limitation, cavity antennas (e.g., Horn antennas), coil antennas, toroid antennas, etc. The separation between the transmitting (first) antenna and the receiving (second) antenna may be adjusted to achieve a desired depth of investigation; larger separations generally correspond greater depths of investigation. The receiving antennas may be placed to have azimuthally symmetric sensitivity, or directed to receive signals from a particular side of the borehole (e.g., the side into which the microstrip antenna transmits, or the opposite side).

Figure 7A:
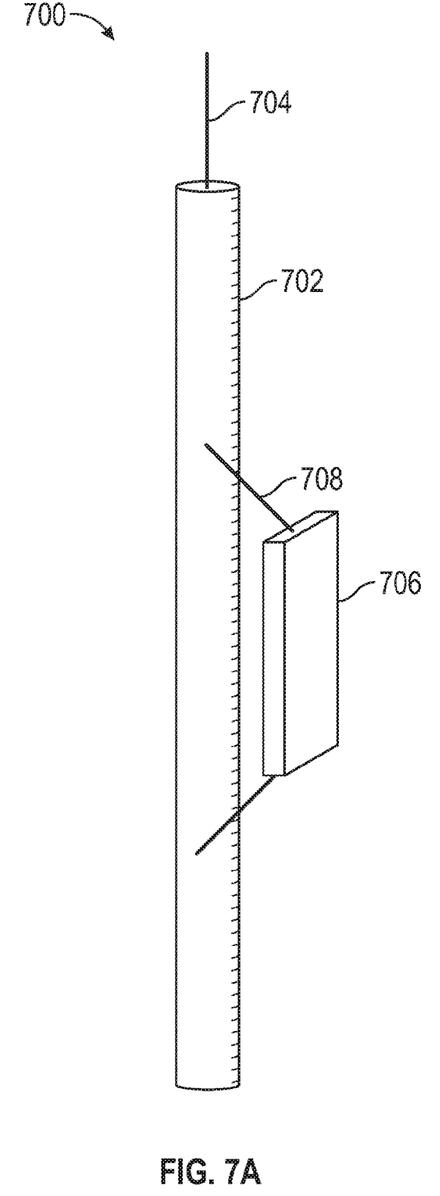
FIG. 7A is a schematic view of an example wireline-deployed dielectric logging tool in accordance with various embodiments.
Figure 7B:
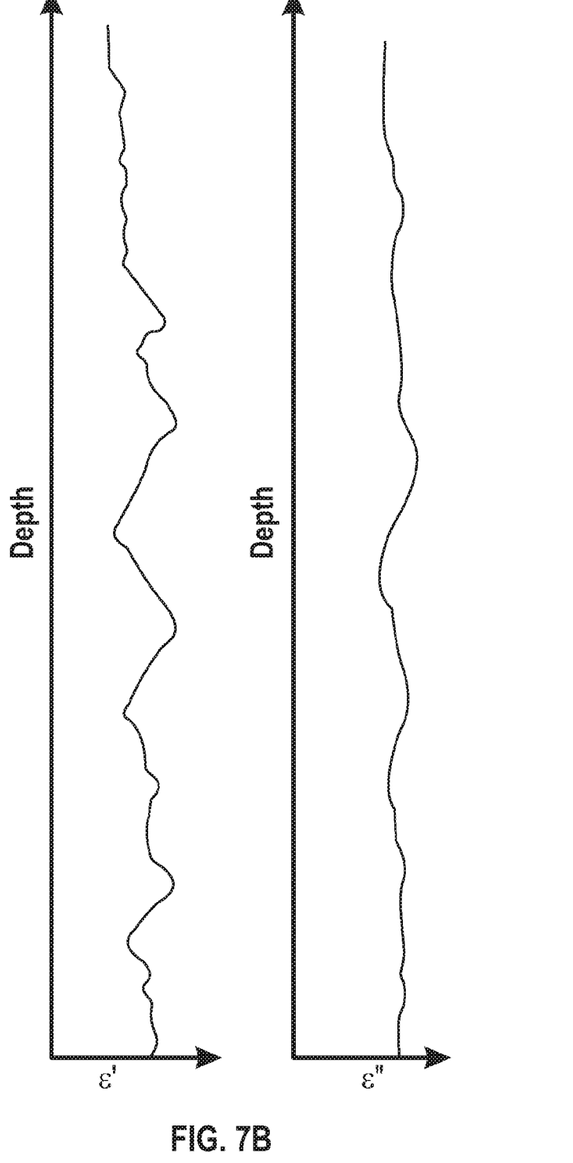
FIG. 7B is an example dielectric log as can be obtained with the tool shown in FIG. 7A.

FIGS. 7A-8C illustrate various configurations of dielectric logging tools in accordance herewith. In FIG. 7A, a wireline-deployed dielectric logging tool 700 having a single antenna is shown. The tool includes a cylindrical tool body 702 suspended from the end of the wireline cable 704, and, extending from the tool body 702, a pad 706 that makes contact with the formation. The pad 706 is articulated through mechanical arms 708 that are attached to the cylindrical tool body such that the pad 706 is kept in optimal contact with the borehole wall regardless of any variation in diameter of the borehole wall. A microstrip antenna (not shown) is mounted on the pad. As the tool 700 is lowered into or pulled out of the borehole, taking measurements along the way (by transmitting first transient waveforms and receiving second transient waveforms at a plurality of depths), a dielectric log is generated. FIG. 7B schematically shows an example dielectric log, including real and imaginary parts of the dielectric constant as a function of depth within the borehole, as can be obtained with the tool shown in FIG. 7A.

Figure 8A:
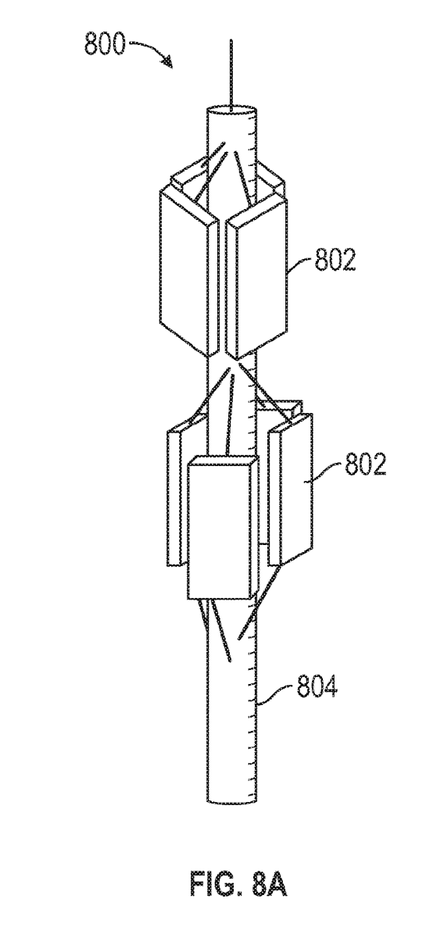
FIG. 8A is a schematic view of an example wireline-deployed dielectric logging tool including multiple microstrip antennas, in accordance with various embodiments.
Figure 8B:
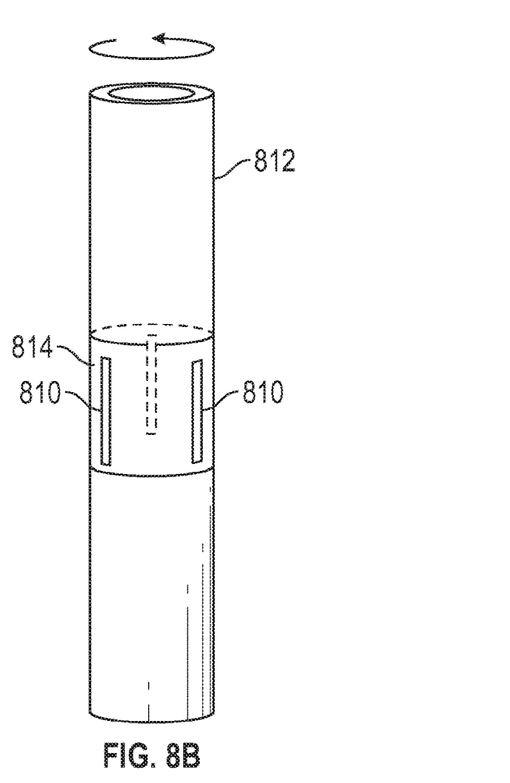
FIG. 8B is a schematic view of an example dielectric logging tool with multiple microstrip antennas, deployed in the bottom hole assembly (BHA) of a drill string, in accordance with various embodiments.
Figure 8C:
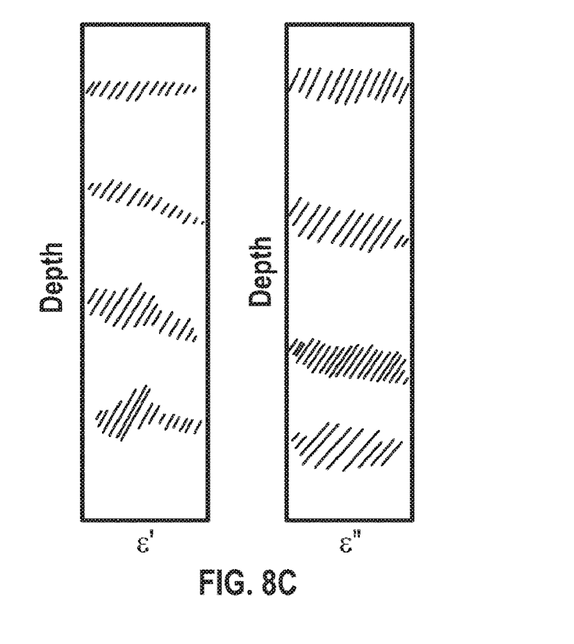
FIG. 8C is an example dielectric image log as can be obtained with the tool shown in FIG. 8A or FIG. 8B.

FIG. 8A is a schematic view of a wireline-deployed logging tool 800 including multiple microstrip antennas, in accordance with various embodiments. The antennas (not shown) are mounted on multiple respective pads 802 arranged around the tool body 804 at different azimuthal (i.e., angular) positions, allowing the dielectric properties to be azimuthally resolved. The number of pads 802 that can be placed at any given axial position (at different azimuthal positions) is constrained by the available space and the pad size. A larger number of pads 802 with a correspondingly greater azimuthal resolution can be achieved however, by slightly displacing some pads in the axial direction relative to others. For example, in FIG. 8A, two groups of four pads 802 each are shown at different axial positions and azimuthally offset relative to each other, achieving an azimuthal resolution equivalent to that of eight pads. FIG. 8B is a schematic view of an example dielectric logging tool with multiple microstrip antennas 810 deployed in the BHA 812 of a drill string, in accordance with various embodiments. The BHA 812 makes contact with the formation. The microstrips 810 are disposed, within a tool section 814 of the BHA pipe, on an insulating layer covering the exterior surface of the BHA pipe (which itself is generally made of steel). As the tool rotates, the microstrip antennas 810 take measurements at continuously varying azimuthal positions. At the same time, the axial position usually also varies as the drill pipe is driven further down into the formation, limiting the azimuthal resolution for a given depth. The resolution can be increased however, by using multiple antennas at varying azimuthal positions around the BHA 812, as shown. Azimuthally resolved measurements, whether acquired by wireline-deployed or BHA-deployed tools, facilitate generating a dielectric image, that is, a log of dielectric properties as a function of depth as well as azimuth (or direction). An example dielectric image (with real and imaginary parts of the dielectric constant) as can be obtained with the tool shown in FIG. 8A or FIG. 8B is shown in FIG. 8C.

In the embodiments of FIGS. 7A, 8A, and 8B, it is possible to orient the microstrip antennas differently, e.g., using at least one antenna with azimuthal alignment and at least one antenna with tool-axis (vertical) alignment. Such embodiments provide the equivalent of broadside and endfire configurations of existing dielectric logging tools.

The processing, modeling, and inversion methods described in this disclosure can be implemented as standalone software, or integrated into a commercial logging software (e.g., InSite®) or earth modeling software (e.g., DecisionSpace®) through an application programming interface (API). The software may be programmed on serial and/or parallel processing architectures. The processing circuitry executing the software may be provided at the well site in a logging facility located above surface (or even integrated, in whole or in part, into the logging tool), or remotely from the well site with one or more computers connected to a well-site logging facility via a computer network. Beneficially, remote processing reduces the computational performance required by the well-site computer(s) while allowing all dielectric processing, modeling, and inversion (regardless whether one-, two-, or three-dimensional) to be performed effectively in real time, subject to network reliability.

Figure 9:
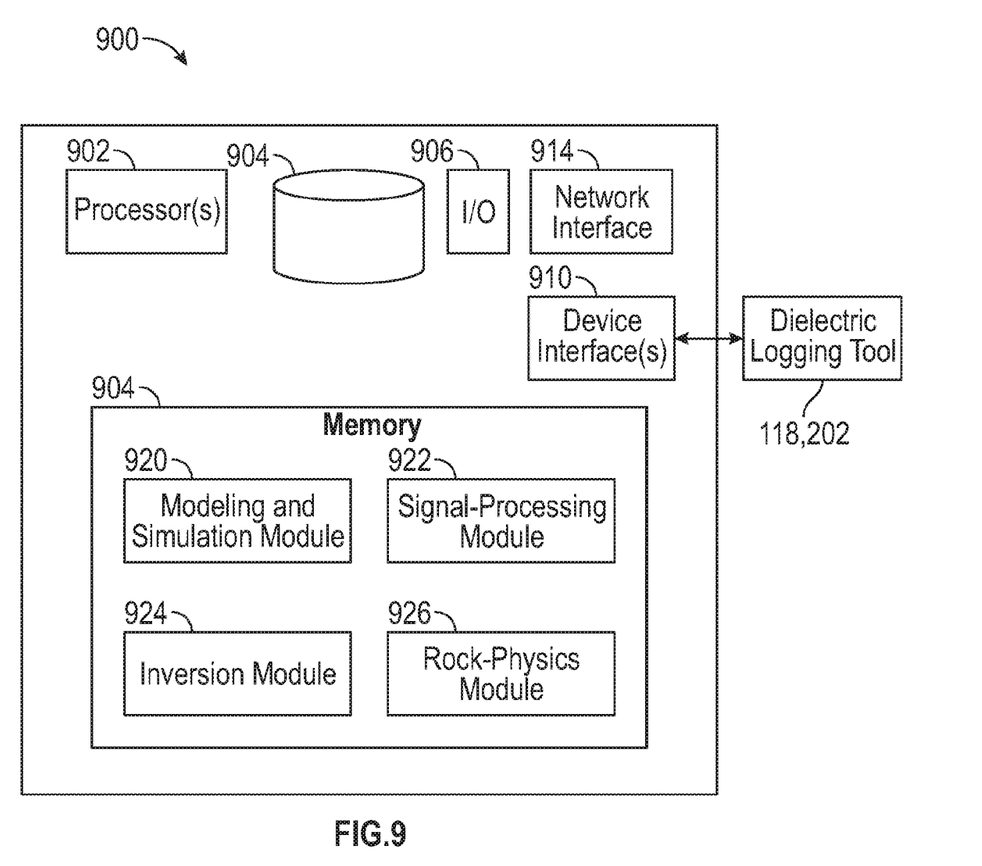
FIG. 9 is a block diagram of an example processing facility for dielectric logging in accordance with various embodiments.

FIG. 9 is a block diagram of example processing circuitry, implemented by a suitably programmed general-purpose computer 900, for processing dielectric logging data in accordance with various embodiments. The computer 900 includes one or more processors 902 (e.g., a conventional central processing unit (CPU), graphical processing unit, or other) configured to execute software programs stored in memory 904 (which may be, e.g., random-access memory (RAM), read-only memory (ROM), flash memory, etc.). In some embodiments, the computer 900 further includes user input/output devices 906 (e.g., a screen, keyboard, mouse, etc.), permanent data-storage devices 908 (including, e.g., solid-state, optical, and/or magnetic machine-readable media such as hard disks, CD-ROMs, DVD-ROMs, etc.), device interfaces 910 for communicating directly or indirectly with the dielectric logging tool (e.g., tool 118 or 202), and/or a network interface 914 that facilitates communication with other computer systems and/or data repositories. The various components of the computer 900 communicate with each other over a system bus (not shown). While shown as a single unit, the processing circuitry may also be distributed over multiple machines connected to each other via a wired or wireless network such as a local network or the Internet.

The software programs stored in the memory 904 include processor-executable instructions for performing the methods described herein, and may be implemented in any of various programming languages, for example and without limitation, C, C++, Object C, Pascal, Basic, Fortran, Matlab, and Python. The instructions may be grouped into various functional modules. In accordance with the depicted embodiment, the modules include, for instance, a modeling and simulation module 920 with which a computational model of the logging tool (including antennas and transmission lines) and of the formation can be defined and the response to an excitation can be computed (e.g., in terms of electric response parameters and their resonance characteristics, frequency spectra vs. time, and/or signal samples). In the computational model, the dielectric properties of the formation may be expressed as the sum of real and imaginary components (or amplitude and phase), which may generally be modeled as frequency-dependent and anisotropic, and as functions of resistivity, conductivity, relative permittivity, permeability, chargeability, and other induced-polarization parameters. The dielectric modeling may employ any combination of analytical, semi-analytical, finite-difference, finite-volume, finite-element, boundary-element, and/or integral-equation methods, implemented in Cartesian, cylindrical, and/or polar coordinates. A signal-processing module 922 may provide the computing functionality for time-frequency analysis and/or for computing the various functions and data (e.g., spectra or peak frequencies) used in time-domain analysis. An inversion module 924 serves to determine the dielectric properties from a comparison, and minimization of a discrepancy, between the data derived from measurement vs. model. A rock-physics module 926, in turn, inverts the dielectric properties of the formation for rock-texture and fluid (or other geophysical) properties. The methods disclosed can be incorporated in methods of joint inversion of dielectric data with any other LWD data (e.g., resistivity, acoustic, nuclear, or nuclear magnetic resonance data). Of course, the computational functionality described herein can be grouped and organized in many different ways, the depicted grouping being just one example. Further, the various computational modules depicted in FIG. 9 need not all be part of the same software program or even stored on the same machine. Rather, certain groups of modules can operate independently of the others and provide data output that can be stored and subsequently provided as input to other modules. Further, as will be readily appreciated by those of ordinary skill in the art, software programs implementing the methods described herein (e.g., organized into functional modules as depicted in FIG. 9) may be stored, separately from any processing facility, in one or more non-volatile machine-readable media (such as, without limitation, solid-state, optical, or magnetic storage media), from which they may be loaded into (volatile) system memory of a processing facility for execution.

In general, the computational functionality described herein (optionally as organized into various functional modules) can be implemented with any suitable combination of hardware, firmware, and/or software. For example, a suitable processing facility may be permanently configured (e.g., with hardwired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

Various embodiments describe above provide conceptually simple radio-frequency circuits for reliably measuring the broadband dielectric properties of a formation (e.g., between about 1 MHz and about 10 GHz). Beneficially, the circuits may utilize non-invasive microstrip antennas, and allow the use of multiple antennas of different resonant frequencies to improve the overall DOI in the formation (e.g., in some embodiments, to four inches into the formation or more). Dielectric logging tools in accordance herewith can be operated as part of both wireline devices and LWD devices.

The following numbered examples are illustrated embodiments:

1. A method comprising: disposing a dielectric logging tool in a borehole to place one or more antennas of the dielectric logging tool adjacent to a formation surrounding the borehole; using the dielectric logging tool to generate a first transient waveform and transmit the first transient waveform via transmission line to at least one of the one or more antennas, and measure at least one second transient waveform received via transmission line, in response to transmission of the first transient waveform, from at least one of the one or more antennas; and analyzing the first and second transient waveforms in the time domain to determine at least one dielectric property of the formation.

2. The method of example 1, wherein the first transient waveform is transmitted to an antenna that is capacitively or galvanically coupled to the formation.

3. The method of example 1 or example 2, wherein the first transient waveform is transmitted to a microstrip antenna.

4. The method of any one of examples 1-3, wherein the at least one second transient waveform comprises a waveform reflected at the at least one antenna to which the first transient waveform was transmitted.

5. The method of any one of examples 1-4, wherein analyzing the first and second transient waveforms comprises using inversion to adjust one or more dielectric parameters in a computational model of the formation.

6. The method of example 5, wherein the inversion is based on time-domain data samples selected from the measured second transient waveform and a transient waveform computed based on the first transient waveform in conjunction with the computational model of the formation.

7. The method of example 5, wherein the inversion is based on a time-frequency map obtained from the measured second transient waveform by short-time frequency transform.

8. The method of any one of examples 1-7, wherein the at least one dielectric property comprises at least one of a resistivity or a dielectric constant.

9. The method of any one of examples 1-8, further comprising determining a geophysical property of the formation from the determined at least one dielectric property using a rock physics model.

10. The method of any one of examples 1-9, wherein the one or more antennas are mounted on one or more pads secured to a wireline tool body, the method comprising generating and transmitting first transient waveforms and receiving second transient waveforms for a plurality of depths along the borehole, and creating a log of the dielectric property of the formation based on the first and second transient waveforms.

11. The method of example 10, wherein the dielectric logging tool comprises a plurality of antennas mounted at different azimuthal positions about an axis of the wireline tool body, the method further comprising generating a dielectric image of the formation based on an analysis of the first and second transient waveforms.

12. The method of any one of examples 1-11, wherein the one or more antennas are mounted on a rotating bottom hole assembly, the method further comprising generating a dielectric image of the formation based on an analysis of the first and second transient waveforms for a plurality of rotational positions.

13. A system comprising: one or more antennas for disposal adjacent to a formation to be characterized; one or more transmission lines connected, at respective first ends thereof, to the one or more antennas; an electronics module connected to the one or more transmission lines at respective second ends thereof, the electronics module comprising a source configured to generate a first transient waveform for transmission to at least one of the one or more antennas and a receiver to receive and measure at least one second transient waveform received from at least one of the one or more antennas in response to transmission of the first transient waveform; and processing circuitry configured to analyze the first and second transient waveforms in the time domain to determine at least one dielectric property of the formation.

14. The system of example 13, wherein the one or more antennas, the one or more transmission lines, and the electronics module are integrated into a dielectric logging tool.

15. The system of example 14, wherein the processing circuitry is integrated into the dielectric logging tool.

16. The system of example 14, wherein the processing circuitry is in remote communication with the dielectric logging tool.

17. The system of any one of examples 14-16, wherein the dielectric logging tool is a wireline logging tool.

18. The system of any one of examples 14-16, wherein the dielectric logging tool is a sub within a bottom hole assembly.

19. The system of any one of examples 14-18, comprising multiple antenna disposed at different azimuthal positions about an axis of the dielectric logging tool.

20. The system of any one of examples claim 14-19, comprising at least one antenna aligned azimuthally and at least one antenna aligned vertically within the dielectric logging tool.

21. The system of any one of examples 13-20, wherein the one or more antennas comprise a microstrip antenna.

22. The system of any one of examples 13-21, wherein at least one of the one or more antennas is configured based on an expected dielectric property of the formation to have a resonance frequency that maximizes sensitivity to changes in the dielectric property of the formation.

23. The system of any one of examples 13-22, comprising multiple microstrip antenna configured for different resonant frequencies.

24. The system of any one of examples 13-23, wherein the processing circuitry is configured to analyze the first and second transient waveforms using an inversion technique to adjust one or more dielectric parameters in a computational model of the formation.

25. The system of any one of examples 13-24, wherein the processing circuitry is further configured to determine a rock property of the formation from the determined at least one dielectric property using a rock physics model.

26. A dielectric logging tool comprising: a tool body for deployment in a borehole; mounted on the tool body, one or more microstrip antennas for disposal adjacent to a formation to be characterized; one or more transmission lines connected, at respective first ends thereof, to the one or more antennas; an electronics module connected to the one or more transmission lines at respective second ends thereof, the electronics module comprising a source configured to generate a transient waveform for transmission to the one or more antennas and a receiver to receive and measure one or more transient waveforms reflected by the one or more antennas.

What is claimed is:

1. A method comprising:
    disposing a dielectric logging tool in a borehole to place one or more antennas of the dielectric logging tool adjacent to a formation surrounding the borehole;
    using the dielectric logging tool to
      generate a first transient waveform and transmit the first transient waveform via transmission line to at least one antenna of the one or more antennas, and
      measure at least one second transient waveform received via transmission line, in response to transmission of the first transient waveform, from at least one of the one or more antennas;
    performing time-domain analysis of the first and the at least one second transient waveforms to determine at least one electric response parameter of the at least one of the one or more antennas based on the first transient waveform and the at least one second transient waveform; and
    determining, based on the at least one electric response parameter, at least one dielectric property of the formation.

2. The method of claim 1, wherein the first transient waveform is transmitted to an antenna that is capacitively or galvanically coupled to the formation.

3. The method of claim 1, wherein the first transient waveform is transmitted to a microstrip antenna.

4. The method of claim 1, wherein the at least one second transient waveform comprises a waveform reflected at the at least one antenna to which the first transient waveform was transmitted.

5. The method of claim 1, further comprising:
    using inversion to adjust one or more dielectric parameters in a computational model of the formation, and
    wherein the inversion is based on at least one of
      time-domain data samples selected from the measured at least one second transient waveform and a transient waveform computed based on the first transient waveform in conjunction with the computational model of the formation and
      a time-frequency map obtained from the measured at least one second transient waveform by short-time frequency transform.

6. The method of claim 1, wherein the at least one dielectric property comprises at least one of a resistivity or a dielectric constant.

7. The method of claim 1, further comprising determining a geophysical property of the formation from the at least one dielectric property using a rock physics model.

8. The method of claim 1, further comprising:
    generating and transmitting first transient waveforms and receiving second transient waveforms for a plurality of depths along the borehole, wherein the dielectric logging tool comprises a plurality of antennas mounted at different azimuthal positions about an axis of a wireline tool body;
    creating a log of the at least one dielectric property of the formation across the plurality of depths based on the first and the at least one second transient waveforms; and
    generating a dielectric image of the formation based on an analysis of the first and the at least one second transient waveforms.

9. The method of claim 1, wherein the one or more antennas are mounted on a rotating bottom hole assembly, the method further comprising generating a dielectric image of the formation based on the time-domain analysis of the first and second transient waveforms for a plurality of azimuthal positions.

10. The method of claim 1, wherein the at least one electric response parameter of the at least one of the one or more antennas comprises at least one of an impedance and a scattering parameter.

11. The method of claim 1, wherein performing time-domain analysis of the first and second transient waveforms to determine at least one electric response parameter of the at least one of the one or more antennas based on the first transient waveform and the second transient waveform comprises performing time-frequency analysis of the first and second transient waveforms.

12. A system comprising:
a dielectric logging tool comprising:
one or more antennas; and
one or more transmission lines connected, at respective first ends thereof, to the one or more antennas;
a processor; and
a machine-readable medium having program code executable by the processor to cause
the system to perform operations comprising:
generate a first transient waveform for transmission to at least one of the one or more antennas;
measure at least one second transient waveform that is received from at least one of the one or more antennas in response to transmission of the first transient waveform; and
analyze, using a time-domain analysis, the first and the at least one second transient waveform to determine at least one electric response parameter of the at least one of the one or more antennas;
based on the at least one electric response parameter, determine at least one dielectric property of a formation in which the one or more antennas are disposed.

13. The system of claim 12, wherein the dielectric logging tool is at least one of a wireline logging tool and a sub within a bottom hole assembly.

14. The system of claim 12, wherein the one or more antennas are disposed at different azimuthal positions about an axis of the dielectric logging tool.

15. The system of claim 12, wherein at least one antenna of the one or more antennas is aligned azimuthally and at least one antenna of the one or more antennas is aligned vertically within the dielectric logging tool.

16. The system of claim 12, wherein at least one of the one or more antennas comprises a microstrip antenna.

17. The system of claim 12, wherein at least one of the one or more antennas is configured, based on an expected value of the at least one dielectric property of the formation, to have a resonance frequency to detect changes in the at least one dielectric property of the formation.

18. The system of claim 12, wherein the one or more antennas comprises a plurality of microstrip antennas, wherein each microstrip antenna of the plurality of microstrip antennas is configured to have a unique resonance frequency.

19. The system of claim 12,
wherein the operations comprise:
adjust one or more dielectric parameters in a computational model of the formation based on the first and second transient waveforms.

20. A dielectric logging tool comprising:
a tool body for deployment in a borehole;
mounted on the tool body, one or more microstrip antennas for disposal adjacent to a formation to be characterized;
one or more transmission lines connected, at respective first ends thereof, to the one or more antennas;
a source configured to generate a first transient waveform for transmission to the one or more antennas via the one or more transmission lines; and
a receiver to receive and measure a second transient waveforms that is transmitted from the one or more antennas via the one or more transmission lines, wherein the second transient waveform is generated in response to transmission of the first transient waveform.

* * * * *

UNITED STATES PATENT AND TRADEMARK OFFICE
CERTIFICATE OF CORRECTION

PATENT NO. : 11,137,515 B2
APPLICATION NO. : 16/464664
DATED : October 5, 2021
INVENTOR(S) : Wilson et al.

Page 1 of 1

It is certified that error appears in the above-identified patent and that said Letters Patent is hereby corrected as shown below:

In the Specification

Column 5, Line 63, the word -pararneter- should read --parameter--

Column 8, Lines 33 and 34, the portion reading -relative permittivity relative permittivity relative permittivity- should read --relative permittivity--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*